(12) United States Patent
Xie et al.

(10) Patent No.: US 12,199,538 B2
(45) Date of Patent: Jan. 14, 2025

(54) MOTOR AND ENERGY CONVERSION DEVICE THEREOF

(71) Applicant: BYD COMPANY LIMITED, Guangdong (CN)

(72) Inventors: Feiyue Xie, Shenzhen (CN); Changjiu Liu, Shenzhen (CN); Jicheng Li, Shenzhen (CN); Lei Hu, Shenzhen (CN); Yihao Zheng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 502 days.

(21) Appl. No.: 17/635,636

(22) PCT Filed: Aug. 13, 2020

(86) PCT No.: PCT/CN2020/108924
§ 371 (c)(1),
(2) Date: Feb. 15, 2022

(87) PCT Pub. No.: WO2021/027878
PCT Pub. Date: Feb. 18, 2021

(65) Prior Publication Data
US 2022/0294380 A1 Sep. 15, 2022

(30) Foreign Application Priority Data
Aug. 15, 2019 (CN) .......................... 201910755484.3

(51) Int. Cl.
*H02K 3/28* (2006.01)
*H02J 7/00* (2006.01)
(Continued)

(52) U.S. Cl.
CPC ............ *H02P 27/08* (2013.01); *H02J 7/0068* (2013.01); *H02J 7/02* (2013.01); *H02K 3/28* (2013.01); *H02M 1/14* (2013.01); *H02M 7/797* (2013.01)

(58) Field of Classification Search
CPC H02P 27/08; H02P 25/22; H02P 21/50; H02J 7/0068; H02J 7/02; H02K 3/28;
(Continued)

(56) References Cited

U.S. PATENT DOCUMENTS 9,748,886 B1 * 8/2017 McDonald ............. B63H 23/10
2009/0261685 A1 10/2009 Akimoto et al.
(Continued)

FOREIGN PATENT DOCUMENTS

| CN | 104393699 A | 3/2015 |
|---|---|---|
| CN | 104795917 A | 7/2015 |

(Continued)

OTHER PUBLICATIONS

International Search Report and Written Opinion for Application No. PCT/CN2020/108924, mailed on Oct. 28, 2020, 14 pages.

*Primary Examiner* — Nghia M Doan

(57) ABSTRACT

The disclosure provides a motor and an energy conversion device. The motor includes a motor coil having x sets of windings. A number of phases of the x sets of windings is $m_x$. In each of the x sets of windings, each phase winding includes $n_x$ coil branches. A first end of each of the $n_x$ coil branches is connected with a first end of a coil branch separated from the coil branch by an electrical angle of 360 degrees, to form $m_x$ phase endpoints. A second end of each of the $n_x$ coil branches of each phase winding is connected with a second end of a coil branch separated from the coil branch by an electrical angle of $P*(360*k_1+360/m_x)$ degrees
(Continued)

to form $n_x$ neutral points, $n_x \geq m_x \geq 2$, $n_x \geq 3$, $p=\pm 1$, $1 \leq k_1 \leq (n_x-1)$, and $m_x$, $n_x$, and $k_1$ are integers.

14 Claims, 6 Drawing Sheets

(51) Int. Cl.
*H02J 7/02* (2016.01)
*H02M 1/14* (2006.01)
*H02M 7/797* (2006.01)
*H02P 25/22* (2006.01)
*H02P 27/08* (2006.01)

(58) Field of Classification Search
CPC ....... H02K 2213/03; H02K 3/04; H02M 1/14; H02M 7/797; B60L 2220/58; B60L 15/20; B60L 2240/429; Y02T 10/64; Y02T 10/72
See application file for complete search history.

(56) References Cited

U.S. PATENT DOCUMENTS

| | | |
|---|---|---|
| 2018/0337566 A1 | 11/2018 | Lan et al. |
| 2022/0289053 A1* | 9/2022 | Lian ........................ B60L 53/22 |

FOREIGN PATENT DOCUMENTS

| | | |
|---|---|---|
| CN | 105846628 A | 8/2016 |
| CN | 106385215 A | 2/2017 |
| CN | 207021795 U | 2/2018 |
| CN | 107846055 A | 3/2018 |
| CN | 109546779 A | 3/2019 |
| JP | 2002027761 A | 1/2002 |
| JP | 2002-044953 A | 2/2002 |
| JP | 2011239589 A | 11/2011 |
| JP | 2017079580 A | 4/2017 |
| JP | 6173507 B1 | 8/2017 |

* cited by examiner

MOTOR AND ENERGY CONVERSION DEVICE THEREOF

CROSS-REFERENCE TO RELATED APPLICATIONS

This application is a National Phase Application of International Patent Application No. PCT/CN2020/108924, filed on Aug. 13, 2020, which is based on and claims priority to and benefits of Chinese Patent Application No. 201910755484.3, entitled "MOTOR AND ENERGY CONVERSION DEVICE THEREOF" filed on Aug. 15, 2019. The entire content of all of the above identified applications is incorporated herein by reference.

FIELD

The disclosure belongs to the field of electronic techniques, and more specifically, to a motor and an energy conversion device thereof.

BACKGROUND

Currently, a motor coil in a motor is generally formed by a plurality of phase coils. First ends of each phase coil are connected together to form a motor coil connection point, and second ends of each phase coils are connected with a driving circuit. Although the motor coil structure can realize the driving of the motor, when a current passes through the motor coil, a mutual inductance effect is generated between the phase coils, impeding control of the current ripples and reduction of the losses, and affecting the working performance of the motor.

SUMMARY

The disclosure provides a motor, to resolve large energy losses and low working performance of a motor caused by a motor coil in the related art.

The disclosure is implemented as follows. A motor includes a motor coil. The motor coil includes x sets of windings, $x \geq 1$, and x is an integer.

A number of phases of an $x^{th}$ set of windings is $m_x$. The motor is operated by controlling each set of $m_x$-phase windings by a motor vector controller.

In each of the x sets of windings, each phase winding includes $n_x$ coil branches.

A first end of each of the $n_x$ coil branches of each phase winding is connected with a first end of a coil branch separated from the coil branch by an electrical angle of 360 degrees, to form $m_x$ phase endpoints.

A second end of each of the $n_x$ coil branches of each phase winding is further connected with a second end of a coil branch separated from the coil branch by an electrical angle of $P*(360*k_1+360/m_x)$ degrees, to form $n_x$ neutral points.

$n_x \geq m_x \geq 2$, $n_x \geq 3$, $p=\pm 1$, $1 \leq k_1 \leq (n_x-1)$, and $m_x$, $n_x$, and $k_1$ are all integers.

The disclosure further provides a motor. The motor includes a motor coil. The motor coil includes x sets of windings, $x \geq 1$, and x is an integer.

A number of phases of each of the x sets of windings is m. The x sets of windings include x*m phase windings. The motor is operated by controlling each set of m-phase windings by a motor vector controller.

In the x*m phase windings, each phase winding includes n coil branches.

Each of the n coil branches of each phase winding is connected with a coil branch separated from the coil branch by an electrical angle of 360 degrees, to form x*m phase endpoints.

Each of the n coil branches of each phase winding is further connected with a coil branch separated from the coil branch by an electrical angle of $P*(360*k_2+360/(x*m))$ degrees, to form n neutral points, $n \geq x*m$, $m \geq 2$, $n \geq 3$, $p = \pm 1$, $1 \leq k_2 \leq (n-1)$, and m, n, and $k_2$ are all integers.

The disclosure further provides an energy conversion device. The energy conversion device includes the above motor and a reversible pulse-width modulation (PWM) rectifier.

A charging circuit or a discharging circuit is formed by an external charging port or a discharging port and an external battery by using the energy conversion device. A driving circuit is formed by the external battery and the energy conversion device. The motor and the reversible PWM rectifier are both connected with the external charging port or the discharging port. The reversible PWM rectifier is connected with the external battery.

In the disclosure, by using the motor coil including the x sets of windings in the motor, a mutual inductance effect generated between the windings when a current passes through the windings can be reduced. Therefore, the capability of controlling current ripples is improved, energy losses of the motor coil are reduced. In this way, the large energy losses and the impedance in the control of the current ripples of the motor coil in the related art are resolved.

DETAILED DESCRIPTION

Figure 1:
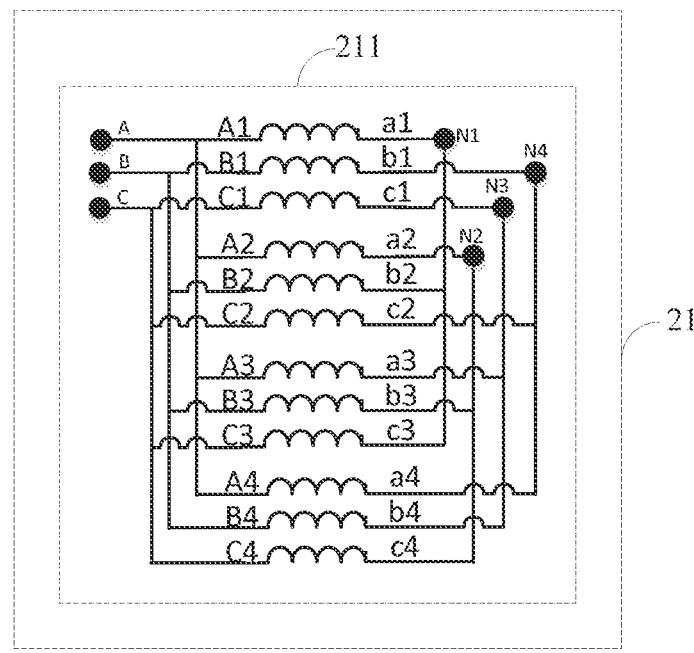
FIG. 1 is a schematic diagram of an exemplary structure of a motor coil according to a first embodiment of the disclosure.

To make the objectives, technical solutions and advantages of the present disclosure more apparent and clearer, the following describes the present disclosure in further detail with reference to the accompanying drawings and embodiments. It should be understood that the specific embodiments described therein are merely used for explaining the present disclosure instead of limiting the present disclosure.

The following describes implementations of the present disclosure in detail with reference to specific accompanying drawings.

An embodiment of the disclosure provides a motor 21. The motor 21 includes a motor coil 211.

Specifically, the motor coil 211 includes x sets of windings, x≥1, and x is an integer. A number of phases of an $x^{th}$ set of windings is $m_x$. The motor is operated by controlling each set of $m_x$-phase winding by a motor vector controller. In each of the x sets of windings, each phase winding includes $n_x$ coil branches. A first end of each of the $n_x$ coil branches of each phase winding is connected with a first end of a coil branch separated from the coil branch by an electrical angle of 360 degrees, to form $m_x$ phase endpoints. A second end of each of the $n_x$ coil branches of each phase winding is further connected with a second end of a coil branch separated from the coil branch by an electrical angle of $P*(360*k_1+360/m_x)$ degrees, to form $n_x$ neutral points, $n_x \geq m_x \geq 2$, $n_x \geq 3$, p=±1, $1 \leq k_1 \leq (n_x-1)$, and $m_x$, $n_x$, and $k_1$ are all integers.

In order to understand a structure of the motor coil 211 more clearly, the structure of the motor coil 211 is described below by using x being 1, $m_x$ being 3, and $n_x$ being 4 as an example.

FIG. 1 is a schematic diagram of a circuit structure of the motor coil 211 when x is 1, $m_x$ is 3, and $n_x$ is 4 according to this embodiment.

Specifically, referring to FIG. 1, the motor coil 211 includes one set of windings. The set of windings include three phase windings: a first phase winding A, a second phase winding B, and a third phase winding C. Each phase winding includes four coil branches. First ends (which are respectively A1, A2, A3, and A4) of the coil branches in the first phase winding A are connected together to form a first phase endpoint. First ends (which are respectively B1, B2, B3, and B4) of the coil branches in the second phase winding B are connected together to form a second phase endpoint. First ends (which are respectively C1, C2, C3, and C4) of the coil branches in the third phase winding C are connected together to form a third phase endpoint.

Further, a second end of each of the four coil branches of each phase winding is connected with a second end of a coil branch separated from the coil branch by an electrical angle of 480 degrees to form four neutral points. In this case, P is 1, and $k_1$ is 1. Specifically, referring to FIG. 1, a second end a1 of a first coil branch of the first phase winding A, a second end b2 of a second coil branch of the second phase winding B, and a second end c3 of a third coil branch of the third phase winding are connected together to form a first neutral point N1. A second end a2 of a second coil branch of the first phase winding A, a second end b3 of a third coil branch of the second phase winding B, and a second end c4 of a fourth coil branch of the third phase winding C are connected together to form a second neutral point N2. A second end c1 of a first coil branch of the third phase winding C, a second end a3 of a third coil branch of the first phase winding A, and a second end b4 of a fourth coil branch of the second phase winding B are connected together to form a third neutral point N3. A second end b1 of a first coil branch of the second phase winding B, a second end c2 of a second coil branch of the third phase winding C, and a second end a4 of a fourth coil branch of the first phase winding A are connected together to form a fourth neutral point N4.

Specifically, when a current passes through the motor coil 211, any two coil branches of a first coil branch of a first phase coil A, a first coil branch of a second phase coil B, and a first coil branch of a third phase coil C are spatially spaced apart to form two overlapping circuits, and a mutual inductance effect is generated between the two coil branches by using the overlapping circuits.

In this embodiment, by means of staggered winding in the motor coil 211, the mutual inductance effect generated when the current passes through the motor coil 211 can be effectively reduced. Therefore, the equivalent inductance can be increased, so that the inductance of the motor coil 211 is increased. In this way, the control of the current ripples is enhanced, and the energy loss of the motor coil is reduced, thereby resolving the problem of the large energy loss and the impedance in the control of the current ripples of the motor coil in the related art.

Further, as an implementation of the disclosure, in each set of windings, projections of the first end of each of the $n_x$ coil branches of each phase winding and the first end of the coil branch separated from the coil branch by the electrical angle of 360 degrees on an end portion of the motor 21 are arranged in a circle. The first end and the second end of each coil branch are opposite to each other in an axial direction of the motor 21.

In order to understand the structure of the motor coil 211 more clearly, the motor coil 211 shown in FIG. 1 is used as an example. In this case, a front-side structure of the one set of windings is shown in FIG. 2, and a back-side structure of the set of windings is shown in FIG. 3.

Figure 2:
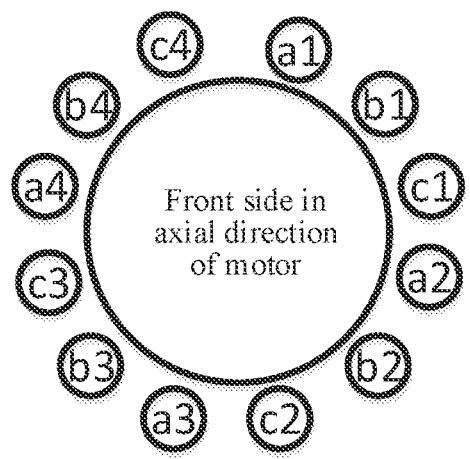
FIG. 2 is a schematic diagram of an exemplary structure of a motor coil according to a second embodiment of the disclosure.
Figure 3:
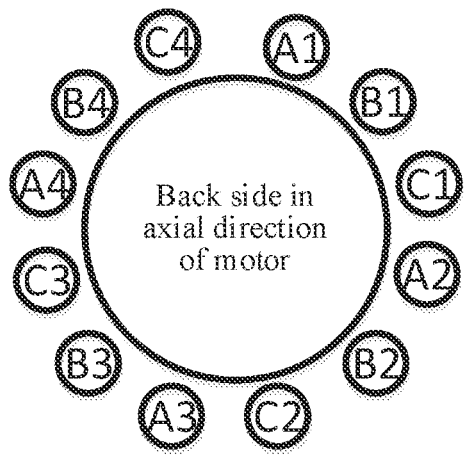
FIG. 3 is a schematic diagram of another exemplary structure of the motor coil according to the second embodiment of the disclosure.

As shown in FIG. 2 and FIG. 3, projections of the first end of each of the four coil branches of each coil and the first end of the coil branch separated from the coil branch by the electrical angle of 360 degrees on the end portion of the motor 21 are arranged in a circle.

The first end and the second end of each coil branch are opposite to each other in the axial direction of the motor 21.

In this embodiment, by arranging the projections of the first end of each of the $n_x$ coil branches of each phase winding and the first end of the coil branch separated from the coil branch by the electrical angle of 360 degrees on the end portion of the motor 21 in a circle, an occupied area of the motor coil can be effectively reduced, and a space utilization for the motor coil 211 in the motor 21 can be increased.

Further, as an implementation of the disclosure, when a number $m_x$ of phases of each set of windings is equal, projections of second ends of $$\sum_{i=1}^{x}(m_x * n_x)$$

coil branches on the end portion of the motor are cyclically arranged in a circle from a $1^{st}$ phase to an $m_x^{th}$ phase. Electrical angles of two coil branches in one phase winding arranged adjacent to each other differ by 360 degrees.

Electrical angles of two adjacent coil branches in $n_x$ coil branches within a same cycle differ by $360/m_x$ degrees.

Cyclic arrangement into a circle from the $1^{st}$ phase to the $m_x^{th}$ phase means that all phase coil branches are arranged from the $1^{st}$ phase to the $m_x^{th}$ phase in ascending order, and the operation is cyclically repeated from the $1^{st}$ phase to the $m_x^{th}$ phase. An arrangement direction of each cycle on the circle is clockwise or counterclockwise.

In order to understand the content of this implementation more clearly, the motor coil 211 shown in FIG. 1 is used as an example. In this case, a projection of the end portion of the motor is shown in FIG. 4.

Figure 4:
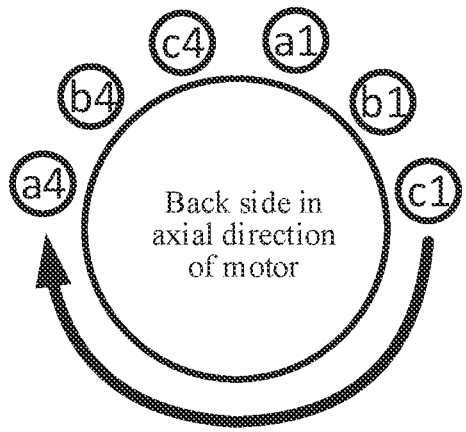
FIG. 4 is a schematic diagram of still another exemplary structure of the motor coil according to the second embodiment of the disclosure.

As shown in FIG. 4, projections of second ends of 12 coil branches on the end portion of the motor are cyclically arranged in a circle according from the first phase winding A to the third phase winding C. Electrical angles of the two coil branches in one phase winding arranged adjacent to each other differ by 360 degrees. Electrical angles of two adjacent coil branches in four coil branches within a same cycle differs by 90 degrees.

It is to be noted that, the cycle herein is specifically composed of a coil branch in each phase winding, and a sequence is an arrangement direction of the projections of all phase windings on the end portion. For example, in the motor coil 211 shown in FIG. 1, a cycle is composed of a coil branch in each phase winding, and four cycles are formed. The arrangement direction of all phase windings is A, B, and C in a clockwise direction. The arrangement direction of all phase windings are C, B, and A in a counterclockwise direction. One cycle in the motor coil 211 is a4, b4, and c4. The clockwise arrangement sequence is a4, b4, and c4. The counterclockwise arrangement sequence is c4, b4, and a4.

As a preferred solution of this embodiment, a coil branch corresponding to an $m_x^{th}$ phase of one of the cycles is not connected with a coil branch corresponding to a first phase of a next cycle, a coil branch corresponding to a first phase of one of the cycles is not connected with a coil branch corresponding to an $m_x^{th}$ phase of a last cycle, and a coil branch corresponding to a first phase of a first cycle is not connected with a coil branch corresponding to an $m_x^{th}$ phase of a $$\sum_{i=1}^{x} n_x^{th}$$

cycle.

In this embodiment, when the number $m_x$ of phases of each set of windings is equal, the projections of the second ends of the $$\sum_{i=1}^{x}(m_x * n_x)$$

coil branches in the motor coil 211 on the end portion of the motor are cyclically arranged in a circle from the $1^{st}$ phase to the $m_x^{th}$ phase, the electrical angles of the two coil branches in one phase winding arranged adjacent to each other differ by 360 degrees, and the electrical angles of the two adjacent coil branches in the $n_x$ coil branches within a same cycle differ by $360/m_x$ degrees. In this way, when the current passes through the motor coil 211, the energy losses can be reduced, and the control of the current ripples is enhanced.

An embodiment of the disclosure provides a motor 22. The motor 22 includes a motor coil 221.

Specifically, the motor 22 includes the motor coil 221. The motor coil 221 includes x sets of windings, x≥1, and x is an integer. A number of phases of each of the x sets of windings is m. The x sets of windings include x*m phase windings. The motor is operated by controlling each set of m-phase winding by a motor vector controller. In the x*m phase windings, each phase winding includes n coil branches. Each of the n coil branches of each phase winding is connected with a coil branch separated from the coil branch by an electrical angle of 360 degrees to form x*m phase endpoints. Each of the n coil branches of each phase winding is further connected with a coil branch separated from the coil branch by an electrical angle of $P*(360*k_2 + 360/(x*m))$ degrees to form n neutral points, n≥x*m, m≥2, n≥3, p=±1, 1≤$k_2$≤(n−1), and m, n, and $k_2$ are all integers.

In order to understand the structure of the motor coil 221 more clearly, the structure of the motor coil 221 is described below by using x being 1, $m_x$ being 6, and $n_x$ being 7 as an example.

Figure 5:
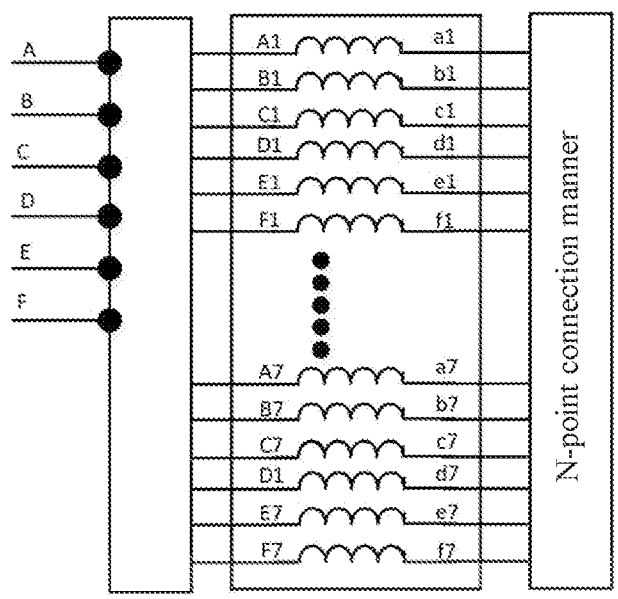
FIG. 5 is a schematic diagram of an exemplary structure of a motor coil according to a third embodiment of the disclosure.

FIG. 5 is a schematic diagram of a circuit structure of the motor coil 221 when x is 1, m is 6, and n is 7 according to this embodiment.

Specifically, referring to FIG. 5, the motor coil 221 includes one set of windings. The set of windings include six phase windings: a first phase winding A, a second phase winding B, a third phase winding C, a fourth phase winding D, a fifth phase winding E, and a sixth phase winding F. Each phase winding includes seven coil branches. First ends (which are respectively A1, A2, A3, A4, A5, A6, and A7) of all of the coil branches in the first phase winding A are connected together to form a first phase endpoint. First ends (which are respectively B1, B2, B3, B4, B5, B6, and B7) of the coil branches in the second phase winding B are connected together to form a second phase endpoint. First ends (which are respectively C1, C2, C3, C4, C5, C6, and C7) of the coil branches in the third phase winding C are connected together to form a third phase endpoint. First ends (which are respectively D1, D2, D3, D4, D5, D6, and D7) of the coil branches in the fourth phase winding U are connected together to form a fourth phase endpoint. First ends (which are respectively E1, E2, E3, E4, E5, E6, and E7) of the coil branches in the fifth phase winding V are connected together to form a fifth phase endpoint. First ends (which are respectively F1, F2, F3, F4, F5, F6, and F7) of the coil branches in the sixth phase winding W are connected together to form a sixth phase endpoint.

Further, a second end of each of the seven coil branches of each phase winding is connected with a second end of a coil branch separated from the coil branch by an electrical angle of 420 degrees to form four neutral points. In this case, P is 1, and $k_2$ is 1. Specifically, referring to FIG. 5, FIG. 5 does not show a method for connecting neutral points N formed by the second ends of all of the coil branches in each phase winding. The method specifically includes the following: A second end a1 of a first coil branch of the first phase winding A, a second end b2 of a second coil branch of the second phase winding B, a second end c3 of a third coil branch of the third phase winding C, a second end d4 of a fourth coil branch of the fourth phase winding D, a second end e5 of a fifth coil branch of a fifth phase winding E, and a second end f6 of a sixth coil branch of the sixth phase winding F are connected together to form a first neutral point N1. A second end a2 of a second coil branch of the first phase winding A, a second end b3 of a third coil branch of the second phase winding B, a second end c4 of a fourth coil branch of the third phase winding C, a second end d5 of a fifth coil branch of the fourth phase winding D, a second end e6 of a sixth coil branch of the fifth phase winding E, and a second end f7 of a seventh coil branch of the sixth phase winding F are connected together to form a second neutral point N2. A second end a3 of a third coil branch of the first phase winding A, a second end b4 of a fourth coil branch of the second phase winding B, a second end c5 of a fifth coil branch of the third phase winding C, a second end d6 of a sixth coil branch of the fourth phase winding D, a second end e7 of a seventh coil branch of the fifth phase winding E, and a second end f1 of a first coil branch of the sixth phase winding F are connected together to form a third neutral point N3. A second end a4 of a fourth coil branch of the first phase winding A, a second end b5 of a fifth coil branch of the second phase winding B, a second end c6 of a sixth coil branch of the third phase winding C, a second end d7 of a seventh coil branch of the fourth phase winding D, a second end e1 of a first coil branch of the fifth phase winding E, and a second end f2 of a second coil branch of the sixth phase winding F are connected together to form a fourth neutral point N4. A second end a5 of a fifth coil branch of the first phase winding A, a second end b6 of a sixth coil branch of the second phase winding B, a second end c7 of a seventh coil branch of the third phase winding C, a second end d1 of a first coil branch of the fourth phase winding D, a second end e2 of a second coil branch of the fifth phase winding E, and a second end f3 of a third coil branch of the sixth phase winding F are connected together to form a fifth neutral point N5. A second end a6 of a sixth coil branch of the first phase winding A, a second end b7 of a seventh coil branch of the second phase winding B, a second end c1 of a first coil branch of the third phase winding C, a second end d2 of a second coil branch of the fourth phase winding D, a second end e3 of a third coil branch of the fifth phase winding E, and a second end f4 of a fourth coil branch of the sixth phase winding F are connected together to form a sixth neutral point N6. A second end a7 of a seventh coil branch of the first phase winding A, a second end b1 of a first coil branch of the second phase winding B, a second end c2 of a second coil branch of the third phase winding C, a second end d3 of a third coil branch of the fourth phase winding D, a second end e4 of a fourth coil branch of the fifth phase winding E, and a second end f5 of a fifth coil branch of the sixth phase winding F are connected together to form a seventh neutral point N7.

In this embodiment, by means of staggered winding in the motor coil 221, the mutual inductance effect generated when the current passes through the motor coil 221 can be effectively reduced. Therefore, equivalent inductance can be increased, so that the inductance of the motor coil 221 is increased. In this way, the control of the current ripples is enhanced, and the energy losses of the motor coil are reduced, thereby resolving the problem of large energy losses and the impedance in the control of the current ripples of the motor coil in the related art.

Further, as an implementation of the disclosure, a phase line of one set of windings is staggered from a phase line of another set of windings, a second end of a coil branch of the set of windings is connected with a second end of a coil branch separated by an electrical angle of $P*(360*k_2+360/(x*m))$ degrees in the another set of windings, to form n neutral points.

In order to understand the content of this implementation more clearly, a structure of the motor coil 211 is described below by using x being 2, $m_x$ being 3, and $n_x$ being 3 as an example.

Figure 9:
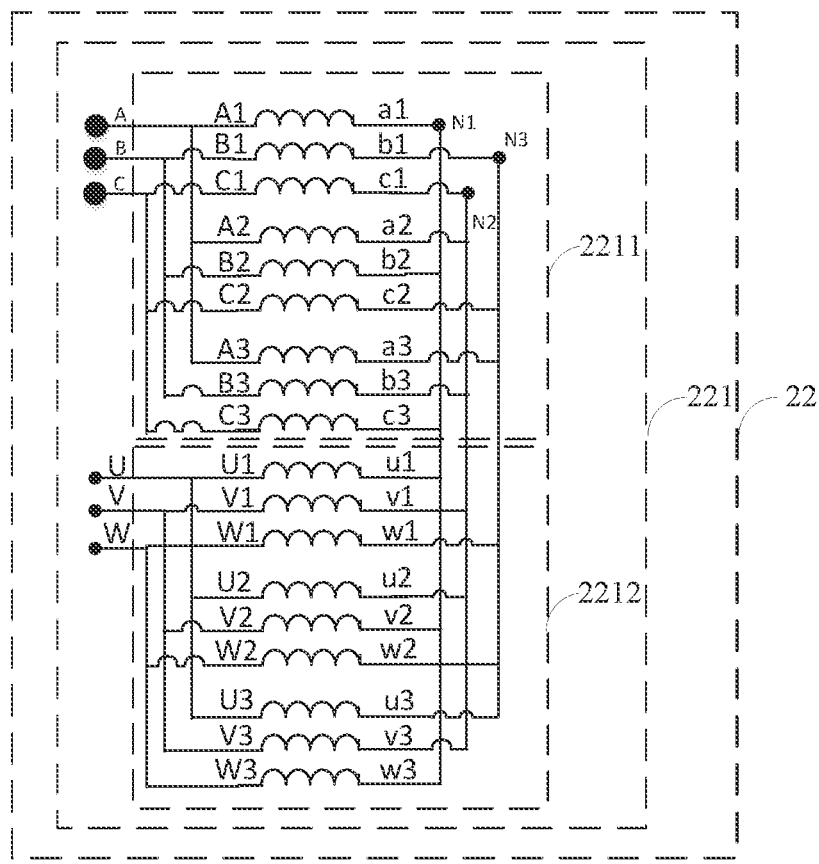
FIG. 9 is a schematic diagram of an exemplary structure of a motor coil according to a fourth embodiment of the disclosure.

FIG. 9 is a schematic diagram of a circuit structure of the motor coil 221 when x is 2, m is 3, and n is 3 according to this embodiment.

Specifically, referring to FIG. 9, the motor coil 221 includes a first set of windings 2211 and a second set of windings 2212. Each set of windings include three phase windings. The three phase windings of the first set of windings are respectively a first phase winding A, a second phase winding B, and a third phase winding C. The three phase windings of the second set of windings are respectively a fourth phase winding U, a fifth phase winding V, and a sixth phase winding W. Each phase winding includes three coil branches. First ends (which are respectively A1, A2, and A3) of all of the coil branches in the first phase winding A are connected together to form a first phase endpoint. First ends (which are respectively B1, B2, and B3) of all of the coil branches in the second phase winding B are connected together to form a second phase endpoint. First ends (which are respectively C1, C2, and C3) of all of the coil branches in the third phase winding C are connected together to form a third phase endpoint. First ends (which are respectively U1, U2, and U3) of all of the coil branches in the fourth phase winding U are connected together to form a fourth phase endpoint. First ends (which are respectively V1, V2, and V3) of all of the coil branches in the fifth phase winding V are connected together to form a fifth phase endpoint. First ends (which are respectively W1, W2, and W3) of all of the coil branches in the sixth phase winding W are connected together to form a sixth phase endpoint.

Further, a second end of each of the three coil branches of each phase winding is connected with a second end of a coil branch separated from the coil branch by an electrical angle of 420 degrees, to form three neutral points. In this case, P is 1, and $k_2$ is 1. For details of a connection method for forming three neutral points, refer to FIG. 9.

In this embodiment, by means of winding in another staggering manner, the mutual inductance effect generated when the current passes through the motor coil 221 can be effectively reduced. Therefore, equivalent inductance can be increased, so that the inductance of the motor coil 221 is increased. In this way, the control of the current ripples is enhanced, and the energy losses of the motor coil are reduced, thereby resolving the problem of large energy losses and the impedance in the control of the current ripples of the motor coil in the related art.

Further, as an implementation of the disclosure, projections of a first end of each of the n coil branches of each phase winding and a first end of a coil branch separated from the coil branch by an electrical angle of 360 degrees on the end portion of the motor are arranged in a circle. The first end and the second end of each coil branch are opposite to each other in an axial direction of the motor.

Figure 6:
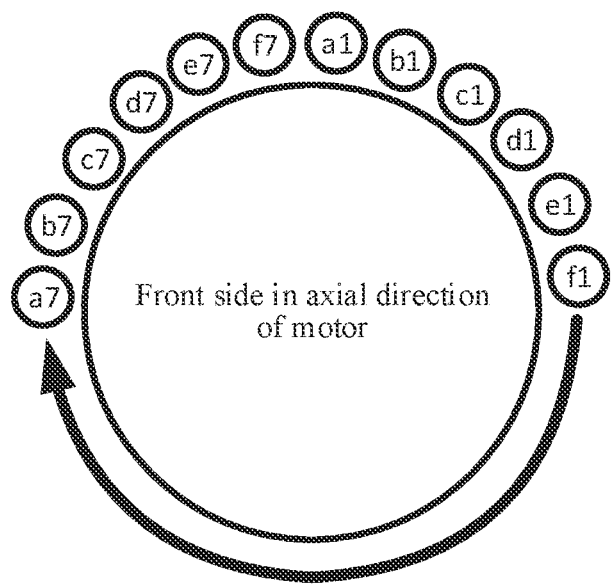
FIG. 6 is a schematic diagram of another exemplary structure of the motor coil according to the third embodiment of the disclosure.
Figure 7:
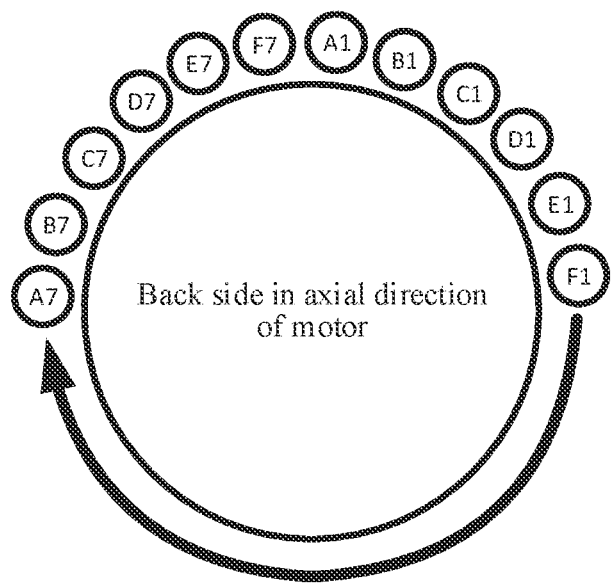
FIG. 7 is a schematic diagram of still another exemplary structure of the motor coil according to the third embodiment of the disclosure.

The motor coil 221 for which x is 1, m is 6, and n is 7 is used as an example. As shown in FIG. 6 and FIG. 7, projections of a first end of each of the n coil branches and a first end of a coil branch separated from the coil branch by an electrical angle of 360 degrees on an end portion of the motor are arranged in a circle.

In this embodiment, by arranging the projections of the first end of each of the $n_x$ coil branches of each phase winding and the first end of the coil branch separated from the coil branch by the electrical angle of 360 degrees on the end portion of the motor 22 in a circle, an occupied area of the motor coil can be effectively reduced, and a space utilization for the motor coil 221 in the motor 22 can be increased.

Further, as an implementation of the disclosure, projections of second ends of m*n coil branches on the end portion of the motor are cyclically arranged in a circle from a $1^{st}$ phase to an $(x*m)^{*th}$ phase, electrical angles of two coil branches in one phase winding arranged adjacent to each other differ by 360 degrees, and electrical angles of two adjacent coil branches in x*m coil branches within a same cycle differ by 360/(x*m) degrees.

Figure 8:
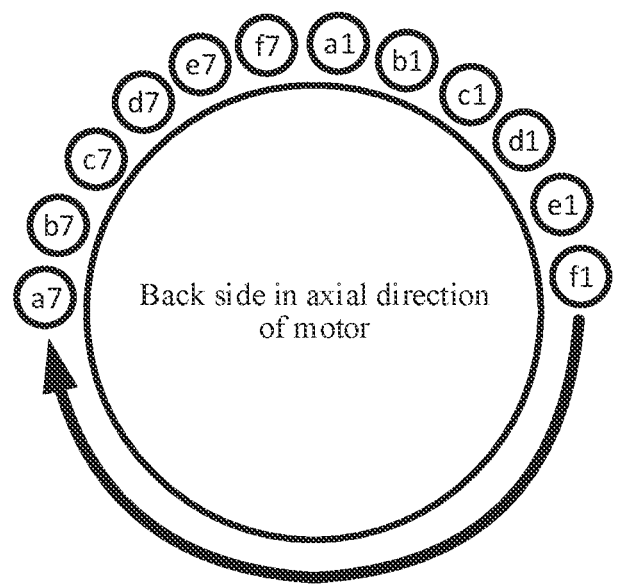
FIG. 8 is a schematic diagram of yet another exemplary structure of the motor coil according to the third embodiment of the disclosure.

The motor coil 221 for which x is 1, m is 6, and n is 7 is as an example. As shown in FIG. 8, projections of second ends of m*n coil branches on the end portion of the motor are cyclically arranged in a circle from a $1^{st}$ phase to an $(x*m)^{th}$ phase.

In this embodiment, projections of second ends of m*n coil branches on the end portion of the motor are cyclically arranged in a circle from a 1st phase to an (x*m)th phase, electrical angles of two coil branches in one phase winding arranged adjacent to each other differ by 360 degrees, and electrical angles of two adjacent coil branches in $n_x$ coil branches within a same cycle differ by 360/(x*m) degrees. In this way, when the current passes through the motor coil 221, the energy losses can be reduced, and the control of the current ripples is enhanced.

Figure 10:
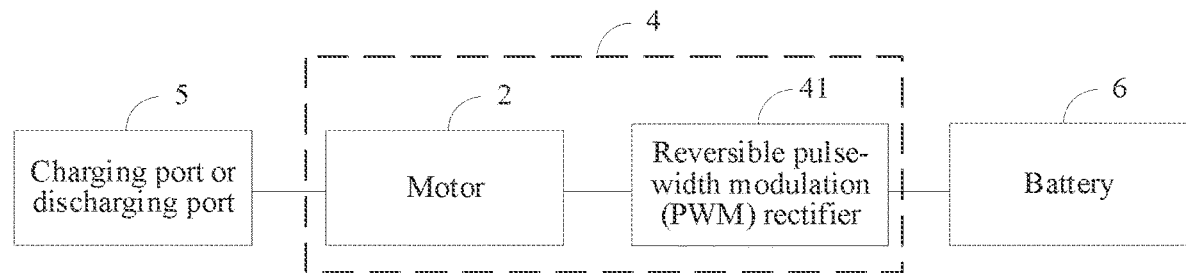
FIG. 10 is a schematic diagram of a module structure of a device according to a fifth embodiment of the disclosure.

As shown in FIG. 10, the disclosure further provides an energy conversion device 4. The energy conversion device 4 includes a motor 2 and a reversible pulse-width modulation (PWM) rectifier 41.

Specifically, the reversible PWM rectifier 41 is connected with the motor 2. A charging circuit or a discharging circuit is formed by an external charging port or a discharging port 5 and an external battery 6 by using the energy conversion device 4. A driving circuit is formed by the external battery 6 and the energy conversion device 4. The motor 2 and the reversible PWM rectifier 41 are both connected with the external charging port or the discharging port 5. The reversible PWM rectifier 41 is connected with the external battery 6.

In the above driving circuit, the reversible PWM rectifier 41 is configured to convert a direct current (DC) inputted by the battery 6 into an alternating current (AC), to drive the motor 2 to operate. In the above charging circuit, the reversible PWM rectifier 41 is configured to boost the DC in cooperation with the motor 2 and output the boosted DC, so as to charge the battery. In the above discharging circuit, the reversible PWM rectifier 41 causes the DC inputted by the battery 6 to be discharged through the discharging port 5.

In the above driving circuit, the motor 2 is configured to receive the AC inputted by the reversible PWM rectifier 41, to achieve driving. In the above charging circuit, the motor 2 is configured to boost the DC in cooperation with the reversible PWM rectifier 41. In the above charging circuit, the motor 2 causes the DC inputted by the battery 6 to be discharged through the discharging port 5.

It is to be noted that, the motor 2 may be the motor 21, or may be the motor 22. The motor 2 includes a motor coil. The motor coil may be the motor coil 211, or may be the motor coil 221. No specific limitation is imposed herein.

In this embodiment, by means of the motor 2 and the reversible PWM rectifier 41, the boosting of the DC can be realized in the charging circuit, and by means of the battery 6 and the reversible PWM rectifier 41, the driving of the motor 2 can be achieved. Therefore, the motor 2 and the reversible PWM rectifier 41 are reused. In this way, the circuit integration level is enhanced, the circuit structure is simplified, thereby reducing the size and the costs.

Further, as an implementation of the disclosure, reversible PWM rectifier 41 includes K groups of $M_x$ bridge arms. A midpoint of at least one bridge arm in a group of $M_x$ bridge arms is connected with a phase endpoint. Any two phase endpoints are connected with different bridge arms. A first end and a second end of each bridge arm in the K groups of $M_x$ bridge arms are connected together to form a first bus terminal and a second bus terminal, $M_x \geq m_x$, $M_x \geq m$, $K \geq x$, and K and $M_x$ are both integers. The external charging port or the discharging port 5 is connected with a neutral line led out from a neutral point of the motor and the second bus terminal. The first bus terminal is connected with a positive electrode of the battery 6, and the second bus terminal is connected with a negative electrode of the battery 6.

In order to understand the content of this embodiment more clearly, K being 1 and $M_x$ being 3 is used as an example.

Figure 11:
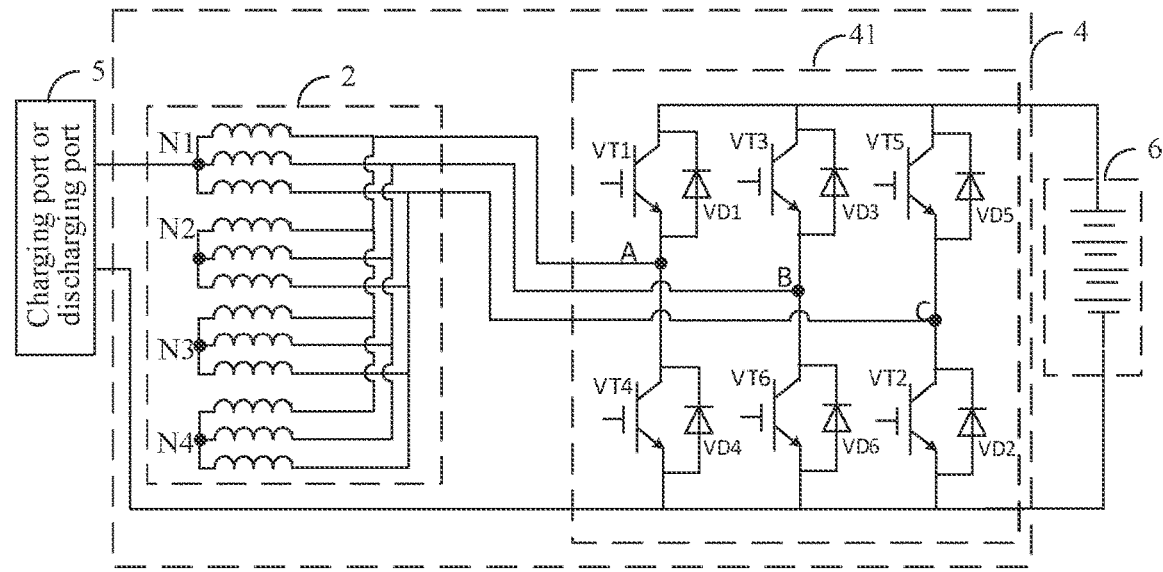
FIG. 11 is a schematic diagram of a circuit structure of a device according to a sixth embodiment of the disclosure.

Specifically, as shown in FIG. 11, the reversible PWM rectifier 41 includes a group of three bridge arms. Each bridge arm includes two power switches connected in series. The motor 2 includes three phase windings. Each phase winding includes four coil branches and forms three phase endpoints: A, B, and C. The three phase endpoints are connected with midpoints of the three bridge arms in a one-to-one correspondence. First ends of all of the bridge arms are connected together to form the first bus terminal, and then connected with the positive electrode of the battery 6. Second terminals of all of the bridge arms are connected together to form the second bus terminal, and then connected with the negative electrode of the battery 6.

In the above embodiment, when the battery 6 outputs a DC, a bridge arm in the reversible PWM rectifier 41 converts the DC into an AC and inputs the AC to one phase winding, so as to drive the motor 2 to operate. Other two phase windings output an AC, and the two bridge arms connected with the other two phase windings convert the AC into a DC, and return the DC to the battery 6.

In the above embodiment, when the charging port or the discharging port 5 inputs a DC, a power switch VT4 is controlled to turn on and a power switch VT1 to turn off, so that an energy storage circuit is formed by the charging port or the discharging port 5, the first phase winding A, and the power switch VT4, and the first phase winding A completes energy storage. When the power switch VT4 is turned off, and the power switch VT1 is turned on, an energy releasing circuit is formed by the charging port or the discharging port 5, the first phase winding A, the power switch VT1, and the battery 6. The power switch VT1 outputs the boosted DC to charge the battery 6.

It is to be noted that, a manner in which a power switch VT3 and a power switch VT5 output a DC is same as the manner in which the power switch VT4 outputs the boosted DC, which is not described herein.

In addition, when the battery 6 outputs the DC, the reversible PWM rectifier 41 and the motor 2 cause the DC to be discharged through the charging port or the discharging port 5. The discharging process is opposite to the above charging process, which is not described herein.

In this embodiment, by means of the reversible PWM rectifier 41 and the motor 2 in cooperation, the DC outputted by the charging port or the discharging port 5 is converted into the boosted DC for charging the battery 6. In addition, when the external battery 6 outputs the DC, the DC is converted by the reversible PWM rectifier 41 into an AC to drive the motor 2. Discharging may be further achieved by the motor 2 and the reversible PWM rectifier 41. Therefore, the reuse of the reversible PWM rectifier 41 and the motor 2 in the driving circuit and the charging and discharging circuits is realized. In this way, the circuit integration level is enhanced, and the circuit structure is simplified, thereby reducing the size and the costs.

Further, as an implementation of the disclosure, at least one neutral line is led out from one of the neutral points of each set of windings.

Specifically, the neutral line may be a neutral line led out from one or more neutral points that are connected together, or may be a plurality of neutral lines correspondingly led out from a plurality of neutral points one by one.

Further, a number of connected neutral points is controlled by using the neutral line, to control the inductance formed by the motor coil in the motor 2. In this way, in different charging and discharging conditions, different numbers of neutral points are connected, to satisfy different charging power requirements.

In this embodiment, by leading out different numbers of neutral lines, the inductance formed by the motor coil in the motor 2 can be controlled, so that the power requirements in different circuit conditions can be satisfied.

Figure 12:
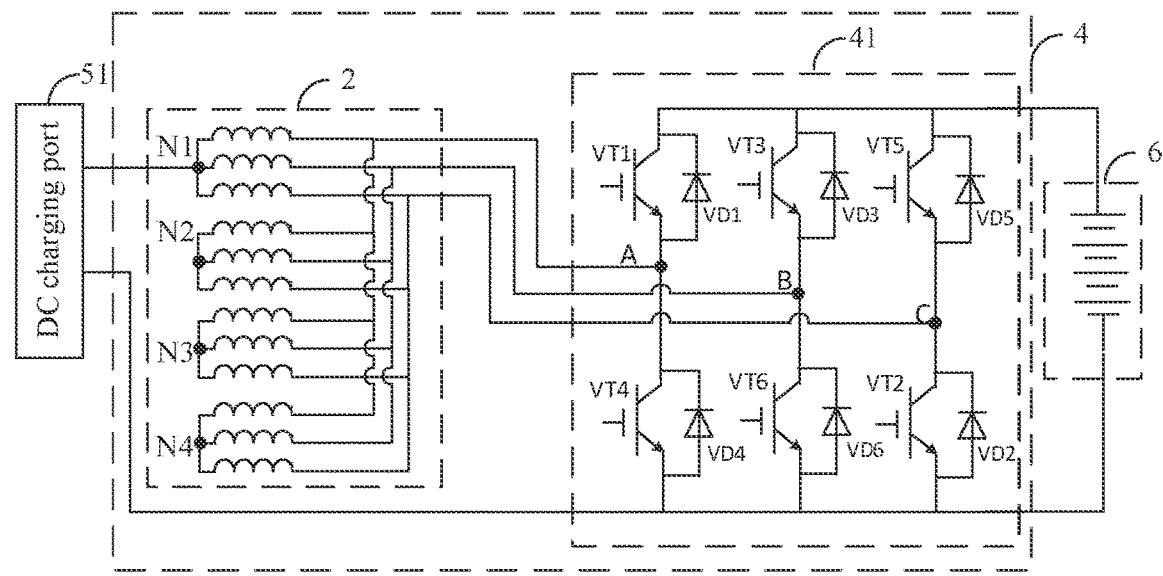
FIG. 12 is a schematic diagram of a circuit structure of a device according to a seventh embodiment of the disclosure.

Further, as an implementation of the disclosure, as shown in FIG. 12, the charging port 5 is a DC charging port 51.

Specifically, one end of the DC charging port 51 is connected with the neutral line, and another end of the DC charging port 51 is connected with the second bus terminal of the reversible PWM rectifier 41.

In this embodiment, a DC charging circuit for charging the battery 6 or a DC discharging circuit is formed by the DC charging port 51, the motor coil, and the reversible PWM rectifier 41. The DC charging circuit and the DC discharging circuit have been described above, and therefore are not described herein again.

In this embodiment, by means of the reversible PWM rectifier 41 and the motor 2 in cooperation, the DC outputted by the DC charging port 51 is converted into the boosted DC for charging the battery 6. In addition, when the external battery 6 outputs the DC, the DC is converted by the reversible PWM rectifier 41 into an AC to drive the motor 2. Discharging may be further achieved by the motor 2 and the reversible PWM rectifier 41. Therefore, the reuse of the reversible PWM rectifier 41 and the motor 2 in the driving circuit and the charging and discharging circuits is realized. In this way, the circuit integration level is enhanced, and the circuit structure is simplified, thereby reducing the size and the costs.

Figure 13:
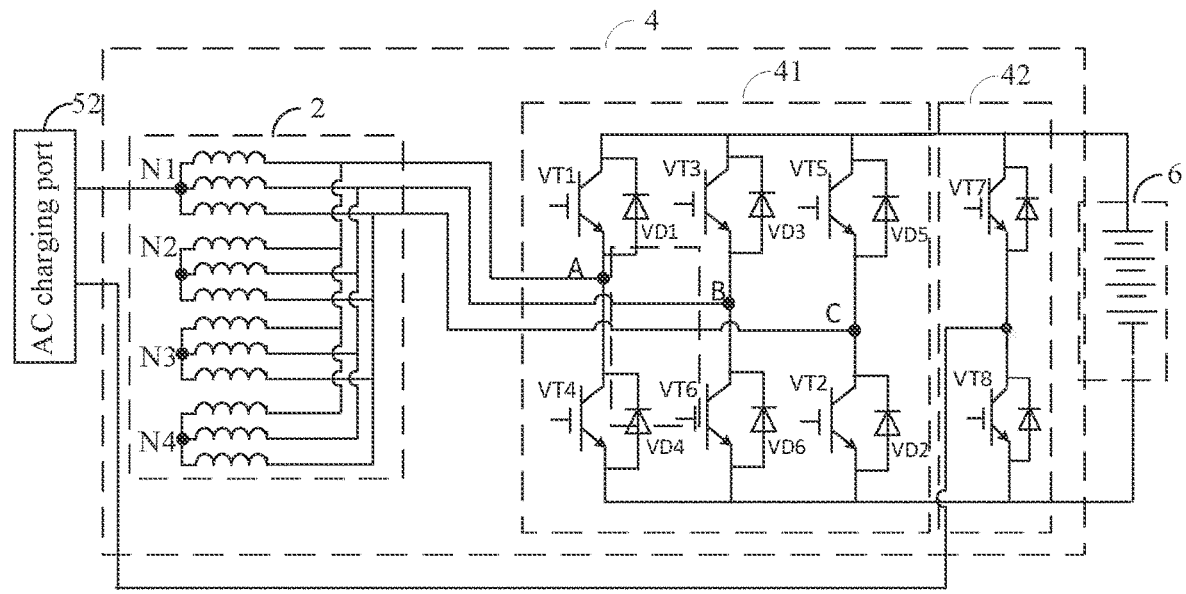
FIG. 13 is a schematic diagram of a circuit structure of a device according to an eighth embodiment of the disclosure.

Further, as an implementation of the disclosure, as shown in FIG. 13, the energy conversion device 4 further includes a two-way bridge arm 42.

Specifically, the charging port or the discharging port 5 includes an AC discharging port 52. One end of the AC discharging port 52 is connected with the motor 2 by the neutral line. The two-way bridge arm 42 is connected between the first bus terminal of the reversible PWM rectifier 41 and the second bus terminal of the reversible PWM rectifier 41. Another end of the AC discharging port 52 is connected with a midpoint of the two-way bridge arm 42.

The two-way bridge arm 42 includes a power switch VT7 and a power switch VT8 connected in series. A midpoint between the power switch VT7 and the power switch VT8 is used as the midpoint of the two-way bridge arm 42.

In this embodiment, the AC charging port 52 inputs an AC. The three bridge arms in the reversible PWM rectifier respectively form rectifier full bridges with the two-way bridge arm 42, and convert the AC inputted by the AC charging port 52 into a DC. The AC charging port cooperates with the motor coil, so that the motor coil can implement the energy storage and energy releasing processes. The boosted DC is outputted by the three bridge arms in the reversible PWM rectifier and the two-way bridge arm 42.

In addition, by means of the two-way bridge arm 42, the reversible PWM rectifier, and the motor 2, AC discharging is performed through the AC charging port on the DC outputted by the battery 6.

In this embodiment, by means of the energy conversion device 4 including the two-way bridge arm 42, AC charging and AC discharging can be achieved by using the energy conversion device 4, and the motor 2 can be driven. In this way, the circuit integration level is enhanced, and the circuit structure is simplified, thereby reducing the size and the costs.

Figure 14:
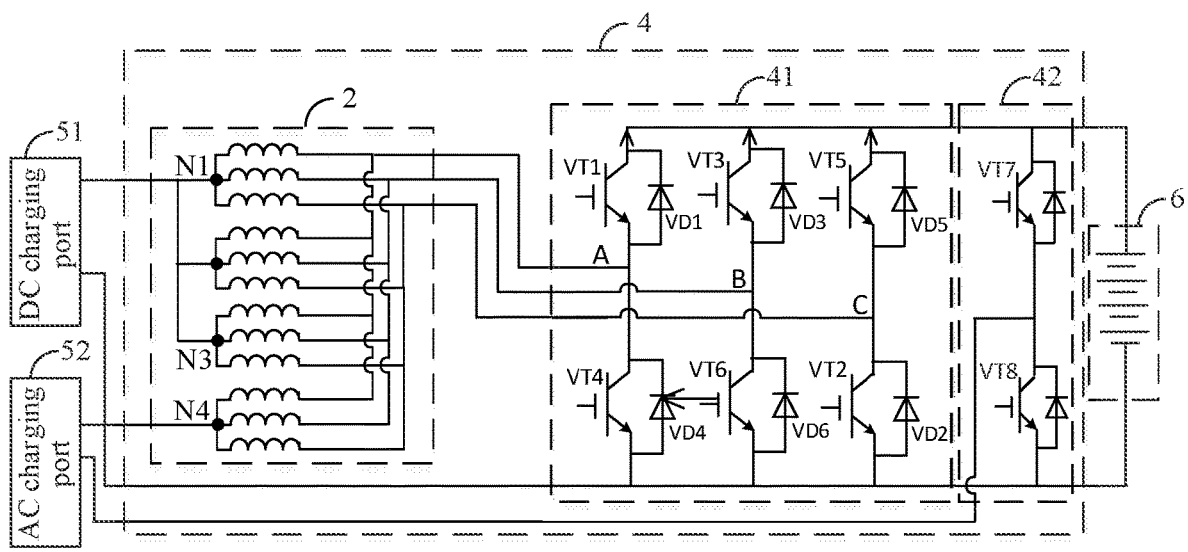
FIG. 14 is a schematic diagram of a circuit structure of a device according to a ninth embodiment of the disclosure.

Further, as an implementation of the disclosure, as shown in FIG. 14, the charging port or the discharging port 5 includes a DC charging port 51 and an AC discharging port 52. The energy conversion device 4 includes a two-way bridge arm 42.

Specifically, one end of the DC charging port 51 is connected with the neutral line, and another end of the DC charging port 51 is connected with the second bus terminal of the reversible PWM rectifier 41. One end of the AC discharging port 52 is connected with the motor 2 by the neutral line. The two-way bridge arm 42 is connected between the first bus terminal of the reversible PWM rectifier 41 and the second bus terminal of the reversible PWM rectifier 41. Another end of the AC discharging port 52 is connected with a midpoint of the two-way bridge arm 42.

The two-way bridge arm 42 includes a power switch VT7 and a power switch VT8 connected in series. A midpoint between the power switch VT7 and the power switch VT8 is used as the midpoint of the two-way bridge arm 42.

In this embodiment, the AC charging port 52 inputs an AC. The three bridge arms in the reversible PWM rectifier respectively form rectifier full bridges with the two-way bridge arm 41, and convert the AC inputted by the AC charging port 52 into a DC. The AC charging port cooperates with the motor coil, so that the motor coil can implement the energy storage and energy releasing processes. The boosted DC is outputted by the three bridge arms in the reversible PWM rectifier and the two-way bridge arm 42. A DC charging circuit for charging the battery 6 or a DC discharging circuit is formed by the DC charging port 51, the motor coil, and the reversible PWM rectifier 41. The DC charging circuit and the DC discharging circuit have been described above, and therefore are not described herein again.

In this embodiment, by means of the reversible PWM rectifier 41 and the motor 2 in cooperation, the DC outputted by the DC charging port 51 is converted into the boosted DC for charging the battery 6, and AC charging and AC discharging can be achieved by using the energy conversion device 4. In addition, when the external battery 6 outputs the DC, the DC is converted by the reversible PWM rectifier 41 into an AC to drive the motor 2. Discharging may be further achieved by the motor 2 and the reversible PWM rectifier 41. Therefore, the reuse of the reversible PWM rectifier 41 and the motor 2 in the driving circuit, the AC the charging and discharging circuits, and the DC charging and discharging circuits is realized. In this way, the circuit integration level is enhanced, and the circuit structure is simplified, thereby reducing the size and the costs. In addition, in the disclosure, a number of connected neutral points may be controlled to control the inductance of the motor coil, so as to satisfy different charging power requirements.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A motor, comprising a motor coil, wherein the motor coil comprises x sets of windings, x≥1, and x is an integer;
   a number of phases of an $x^{th}$ set of windings is $m_x$, the motor is operated by controlling each set of $m_x$-phase windings by a motor vector controller;
   in each of the x sets of windings, each phase winding comprises $n_x$ coil branches;
   a first end of each of the $n_x$ coil branches of each phase winding is connected with a first end of a coil branch separated from the coil branch by an electrical angle of 360 degrees, to form $m_x$ phase endpoints;
   a second end of each of the $n_x$ coil branches of each phase winding is further connected with a second end of a coil branch separated from the coil branch by an electrical angle of $P*(360*k_1+360/m_x)$ degrees, to form $n_x$ neutral points; and
   $n_x \geq m_x \geq 2$, $n_x \geq 3$, $P=\pm 1$, $1 \leq k_1 \leq (n_x-1)$, and $m_x$, $n_x$, and $k_1$ are integers.

2. The motor according to claim 1, wherein in each set of windings, projections of the first end of each of the $n_x$ coil branches of each phase winding and the first end of the coil branch separated from the coil branch by the electrical angle of 360 degrees on an end portion of the motor are arranged in a circle, and the first end and the second end of each coil branch are opposite to each other in an axial direction of the motor.

3. The motor according to claim 1, wherein when a number $m_x$ of phases of each set of windings is equal, projections of second ends of $$\sum_{i=1}^{x}(m_x * n_x)$$

coil branches on an end portion of the motor are cyclically arranged in a circle from a $1^{st}$ phase to an $m_x^{th}$ phase, electrical angles of two coil branches in one phase winding arranged adjacent to each other differ by 360 degrees, and electrical angles of two adjacent coil branches in $m_x$ coil branches within a same cycle differ by $360/m_x$ degrees.

4. A motor, comprising a motor coil, wherein
   the motor coil comprises x sets of windings, x≥1, and x is an integer;
   a number of phases of each of the x sets of windings is m, the x sets of windings comprise x*m phase windings, the motor is operated by controlling each set of m-phase windings by a motor vector controller;
   in the x*m phase windings, each phase winding comprises n coil branches;
   each of the n coil branches of each phase winding is connected with a coil branch separated from the coil branch by an electrical angle of 360 degrees, to form x*m phase endpoints;
   each of the n coil branches of each phase winding is further connected with a coil branch separated from the coil branch by an electrical angle of $P*(360*k_2+360/(x*m))$ degrees, to form n neutral points; and
   $n \geq x*m$, $m \geq 2$, $n \geq 3$, $P=\pm 1$, $1 \leq k_2 \leq (n-1)$, and m, n, and $k_2$ are integers.

5. The motor according to claim 4, wherein a phase line of a first set of windings is staggered from a phase line of a second set of windings, and a second end of a first coil branch of the first set of windings is connected with a second end of a second coil branch in the second set of windings separated by an electrical angle of $P*(360*k_2+360/(x*m))$ degrees from the first coil branch, to form n neutral points.

6. The motor according to claim 4, wherein projections of a first end of each of the n coil branches of each phase winding and a first end of the coil branch separated from the coil branch by the electrical angle of 360 degrees on an end portion of the motor are arranged in a circle, and the first end and a second end of each coil branch are opposite to each other in an axial direction of the motor.

7. The motor according to claim 5, wherein projections of second ends of m*n coil branches on an end portion of the motor are cyclically arranged in a circle from a $1^{st}$ phase to an $(x*m)^{th}$ phase, electrical angles of two coil branches in one phase winding arranged adjacent to each other differ by 360 degrees, and electrical angles of two adjacent coil branches in x*m coil branches within a same cycle differ by $360/(x*m)$ degrees.

8. An energy conversion device, comprising a motor and a reversible pulse-width modulation (PWM) rectifier, wherein:
   the motor comprises a motor coil including x sets of windings, wherein x≥1, and x is an integer, a number of phases of an $x^{th}$ set of windings is $m_x$, the motor is operated by controlling each set of $m_x$-phase windings by a motor vector controller; in each of the x sets of windings, each phase winding comprises $n_x$ coil branches; a first end of each of the $n_x$ coil branches of each phase winding is connected with a first end of a coil branch separated from the coil branch by an electrical angle of 360 degrees, to form $m_x$ phase endpoints; a second end of each of the $n_x$ coil branches of each phase winding is further connected with a second end of a coil branch separated from the coil branch by an electrical angle of $P*(360*k_1+360/m_x)$ degrees, to form $n_x$ neutral points; and $n_x \geq m_x \geq 2$, $n_x \geq 3$, $P=\pm 1$, $1 \leq k_1 \leq (n_x-1)$, and $m_x$, $n_x$, and $k_1$ are integers; and
   a charging circuit or a discharging circuit is formed by an external charging port or a discharging port, and an external battery by using the energy conversion device, a driving circuit is formed by the external battery and the energy conversion device, the motor and the reversible PWM rectifier are both connected with the external charging port or the discharging port, and the reversible PWM rectifier is connected with the external battery.

9. The energy conversion device according to claim 8, wherein the reversible PWM rectifier comprises K groups of $M_x$ bridge arms, a midpoint of at least one bridge arm in a group of $M_x$ bridge arms is connected with a phase endpoint, different phase endpoints are respectively connected to different bridge arms, a first end of each bridge arm in the K groups of $M_x$ bridge arms are connected together to form a first bus terminal, and a second end of each bridge arm in the K groups of $M_x$ bridge arms are connected together to form a second bus terminal, $M_x \geq m_x$, $M_x \geq m$, $K \geq x$, K and $M_x$ are both integers; and
   the external charging port or the discharging port is connected with a neutral line led out from a neutral point of the motor and the second bus terminal, the first bus terminal is connected with a positive electrode of the external battery, and the second bus terminal is connected with a negative electrode of the external battery.

10. The energy conversion device according to claim 9, wherein at least one neutral line is led out from one of the neutral points of each set of windings.

11. The energy conversion device according to claim 9, wherein at least two of the neutral points of each set of windings are connected together to lead out at least one neutral line.

12. The energy conversion device according to claim 10, wherein the external charging port comprises a direct current (DC) charging port, the DC charging port is connected with at least one neutral point through one neutral line, the DC charging port is further connected with the second bus terminal, and a DC charging circuit for charging the external battery or a DC discharging circuit for charging the external battery is formed by the DC charging port, the motor coil, and the reversible PWM rectifier.

13. The energy conversion device according to claim 10, further comprising a two-way bridge arm, wherein a first end of the two-way bridge arm is connected with the first bus terminal, a second end of the two-way bridge arm is connected with the second bus terminal, the external charging port comprises an alternating current (AC) charging port, the AC charging port is connected with at least one neutral point through one neutral line, the AC charging port is further connected with a third end of the two-way bridge arm, and an AC charging circuit for charging the external battery or an AC discharging circuit is formed by the AC charging port, the motor coil, the reversible PWM rectifier, and the two-way bridge arm.

14. The energy conversion device according to claim 10, further comprising a two-way bridge arm, wherein a first end of the two-way bridge arm is connected with the first bus terminal, a second end of the two-way bridge arm is connected with the second bus terminal, and the external charging port comprises a DC charging port and an AC charging port;

the DC charging port is connected with at least one neutral point through one neutral line, the DC charging port is further connected with the second bus terminal, a DC charging circuit for charging the external battery or a DC discharging circuit is formed by the DC charging port, the motor coil, and the reversible PWM rectifier; and the AC charging port is connected with at least one neutral point through one neutral line, the AC charging port is further connected with a midpoint of the two-way bridge arm, an AC charging circuit for charging the external battery or an AC discharging circuit is formed by the AC charging port, the motor coil, the reversible PWM rectifier, and the two-way bridge arm, and the DC charging port and the AC charging port are connected with different neutral lines and different neutral points.

* * * * *

UNITED STATES PATENT AND TRADEMARK OFFICE
CERTIFICATE OF CORRECTION

PATENT NO. : 12,199,538 B2
APPLICATION NO. : 17/635636
DATED : January 14, 2025
INVENTOR(S) : Feiyue Xie et al.

It is certified that error appears in the above-identified patent and that said Letters Patent is hereby corrected as shown below:

In the Specification

In Column 9, Line 4, that reads "phase to an (x*m)*th phase" should read – phase to an (x*m)th phase –

In Column 12, Line 42, that reads "two-way bridge arm 42." should read – two-way bridge arm 41. –

In the Claims

In Column 13, Line 50, Claim 4, that reads "x sets of winding is in" should read – x sets of winding is m –

In Column 14, Line 17, Claim 7, that reads "an $(x*m)^{*th}$" should read – an $(x*m)^{th}$ –

In Column 14, Line 34, Claim 8, that reads "electrical angle of 360 degrees" should read – electrical angle of P*360 degrees –

Signed and Sealed this
Seventeenth Day of June, 2025

Coke Morgan Stewart
*Acting Director of the United States Patent and Trademark Office*